US010440170B2

United States Patent
Cho et al.

(10) Patent No.: US 10,440,170 B2
(45) Date of Patent: *Oct. 8, 2019

(54) APPARATUS AND METHOD FOR TRANSMITTING/RECEIVING MESSAGE IN MOBILE COMMUNICATION TERMINAL WITH TOUCH SCREEN

(71) Applicant: Samsung Electronics Co., Ltd., Suwon-si, Gyeonggi-do (KR)

(72) Inventors: Yun-Ri Cho, Suwon-si (KR); Pil-Sik Choi, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 367 days.

This patent is subject to a terminal disclaimer.

(21) Appl. No.: 14/507,035

(22) Filed: Oct. 6, 2014

(65) Prior Publication Data

US 2015/0026593 A1 Jan. 22, 2015

Related U.S. Application Data

(63) Continuation of application No. 12/897,226, filed on Oct. 4, 2010, now Pat. No. 8,855,688.

(30) Foreign Application Priority Data

Oct. 9, 2009 (KR) ........................ 10-2009-0096375

(51) Int. Cl.
*H04W 4/12* (2009.01)
*H04M 1/725* (2006.01)
(Continued)

(52) U.S. Cl.
CPC ...... *H04M 1/72547* (2013.01); *G06F 3/0488* (2013.01); *G06F 3/04842* (2013.01);
(Continued)

(58) Field of Classification Search
CPC ....... H04W 4/12; H04W 4/414; H04W 4/418; H04W 52/0254; H04W 52/0258; H04W 68/00; H04W 4/14; H04W 4/18
(Continued)

(56) References Cited

U.S. PATENT DOCUMENTS 6,724,403 B1 4/2004 Santoro et al.
7,107,541 B2 9/2006 Sakai
(Continued)

FOREIGN PATENT DOCUMENTS

JP 2003-186586 A 7/2003
KR 10-2008-0075599 A 8/2008
(Continued)

*Primary Examiner* — Jean A Gelin
(74) *Attorney, Agent, or Firm* — Jefferson IP Law, LLP

(57) ABSTRACT

An apparatus and method for transmitting/receiving a message in a mobile communication terminal with a touch screen are provided. The method includes generating a Simple Contact Object (SCO) mapped to at least one contact and a Simple Inputbox Object (SIO) for message composition, displaying the generated SCO and SIO on an idle screen in a widget format, composing a message using the displayed SIO, and storing the composed message in the SIO, and, when a contact between the SIO storing the message therein and the SCO is detected, transmitting the stored message to the contact mapped to the SCO.

24 Claims, 10 Drawing Sheets

(51) Int. Cl.
  *G06F 3/0484* (2013.01)
  *G06F 3/0488* (2013.01)
  *H04L 12/58* (2006.01)

(52) U.S. Cl.
  CPC ....... *H04L 51/046* (2013.01); *H04M 2250/22* (2013.01); *H04W 4/12* (2013.01)

(58) Field of Classification Search
  USPC ........ 455/414.1, 412.1, 458, 459, 466, 566;
  715/165, 773, 769, 700, 733, 752;
  709/220, 222, 223, 225, 226; 345/156
  See application file for complete search history.

(56) References Cited

U.S. PATENT DOCUMENTS

| | | | |
|---|---|---|---|
| 8,271,046 B2 | 9/2012 | Kim et al. | |
| 8,352,334 B2 | 1/2013 | Ulinski | |
| 9,942,383 B2 * | 4/2018 | Deng | H04M 1/274516 |
| 2007/0244811 A1 | 10/2007 | Tumminaro | |
| 2007/0255653 A1 | 11/2007 | Tumminaro et al. | |
| 2008/0195961 A1 | 8/2008 | Bae et al. | |
| 2008/0208842 A1 | 8/2008 | Jeon | |
| 2008/0227435 A1 | 9/2008 | Six et al. | |
| 2008/0242256 A1 | 10/2008 | Gunzelmann et al. | |
| 2009/0319908 A1 | 12/2009 | Hummel et al. | |
| 2010/0029255 A1 | 2/2010 | Kim et al. | |
| 2010/0058193 A1 | 3/2010 | Sherrard et al. | |
| 2010/0138763 A1 | 6/2010 | Kim | |
| 2010/0146555 A1 | 6/2010 | Komsi | |
| 2011/0014932 A1 | 1/2011 | Estevez | |
| 2011/0035691 A1 | 2/2011 | Kim | |
| 2011/0061006 A1 | 3/2011 | Song et al. | |
| 2011/0099507 A1 | 4/2011 | Nesladek et al. | |
| 2011/0320347 A1 | 12/2011 | Tumminaro et al. | |
| 2012/0209878 A1 | 8/2012 | Park et al. | |
| 2012/0216139 A1 | 8/2012 | Ording et al. | |
| 2012/0238325 A1 | 9/2012 | Jung et al. | |

FOREIGN PATENT DOCUMENTS

| | | |
|---|---|---|
| KR | 10-2009-0076094 A | 7/2009 |
| KR | 10-2009-0036423 A | 4/2015 |

\* cited by examiner

APPARATUS AND METHOD FOR TRANSMITTING/RECEIVING MESSAGE IN MOBILE COMMUNICATION TERMINAL WITH TOUCH SCREEN

PRIORITY

This application is a continuation application of a prior application Ser. No. 12/897,226, filed on Oct. 4, 2010, which claimed the benefit under 35 U.S.C. § 119(a) of a Korean patent application filed on Oct. 9, 2009 in the Korean Intellectual Property Office and assigned Serial number 10-2009-0096375, the entire disclosure of which is hereby incorporated by reference.

BACKGROUND OF THE INVENTION

1. Field of the Invention

The present invention relates to message transmission/reception. More particularly, the present invention relates to an apparatus and method for transmitting/receiving a message in a mobile communication terminal with a touch screen.

2. Description of the Related Art

Mobile communication terminals are spreading in use partly because of the convenience of carrying them. Thus, service providers (i.e., system manufacturers) are competitively developing mobile communication terminals having more special functions, in order to secure many users. For example, the mobile communication terminals are providing a variety of functions, such as a video call function, a message transmission/reception function, a camera function, a digital mobile broadcasting function (such as Digital Multimedia Broadcasting (DMB) or Digital Video Broadcasting (DVB)), and the like, as well as a voice call function.

Particularly, the message transmission/reception function enables a user to forward information to a called party, or to have a conversation through a text with the called party, at a lower cost than a voice call. Accordingly, users making use of the message transmission/reception function are increasing in number.

However, in the case that a user intends to transmit a message to a called party using the message transmission/reception function, the user will go through a process of several steps. For instance, in order to transmit a message to a called party's phone number, the user needs to select a message transmission function using a menu or hot key of a mobile communication terminal, input the contents of the message to be transmitted, input the phone number of the party to receive the message, and press an input/okay key.

On the other hand, as the design of a mobile communication terminal is diversified, user of mobile communication terminals with touch screens is increasing. Commonly, the touch screen provides an interface for a user to input a command or information to the mobile communication terminal by touching an icon displayed on the touch screen with a finger, a pointer, etc.

However, even in the mobile communication terminal with the touch screen, when a user intends to transmit a message to a called party using the message transmission/reception function, the user will go through a process of several steps. In detail, the mobile communication terminal with the touch screen changes only a message input scheme from physical button to touch, and still provides a monotonous environment accessing a menu for message transmission, composing a message, and transmitting the message, as in the existing message transmission/reception environment.

SUMMARY OF THE INVENTION

An aspect of the present invention is to address at least the above-mentioned problems and/or disadvantages and to provide at least the advantages below. Accordingly, an aspect of the present invention is to provide an apparatus and method for transmitting/receiving a message in a mobile communication terminal with a touch screen.

Another aspect of the present invention is to provide an apparatus and method for simply, conveniently, and rapidly transmitting/receiving a message in a mobile communication terminal with a touch screen.

A further aspect of the present invention is to provide an apparatus and method for maximizing the convenience of message use and increasing the frequency of message use of a user of a mobile communication terminal with a touch screen.

Yet another aspect of the present invention is to provide an apparatus and method for combining the convenience of a touch screen with a message transmission/reception function, and enabling a user to conveniently and interestingly transmit/receive a message in an idle screen in a mobile communication terminal with a touch screen.

The above aspects are achieved by providing an apparatus and method for transmitting/receiving a message in a mobile communication terminal with a touch screen.

In accordance with an aspect of the present invention, a method for transmitting a message in a mobile communication terminal with a touch screen is provided. The method includes generating a Simple Contact Object (SCO) mapped to at least one phone number and a Simple Inputbox Object (SIO) for message composition, displaying the generated SCO and SIO on an idle screen in a widget format, composing a message using the displayed SIO, and storing the composed message in the SIO, and, when a contact between the SIO storing the message therein and the SCO is detected, transmitting the stored message to the phone number mapped to the SCO.

In accordance with another aspect of the present invention, an apparatus for transmitting a message in a mobile communication terminal with a touch screen is provided. The apparatus includes a controller and the touch screen. The controller generates an SCO mapped to at least one phone number and an SIO for message composition, displays the generated SCO and SIO on an idle screen in a widget format through the touch screen, composes a message using the displayed SIO, and stores the composed message in the SIO, and, when a contact between the SIO storing the message therein and the SCO is detected, transmits the stored message to the phone number mapped to the SCO. The touch screen displays the generated SCO and SIO on the idle screen in the widget format, detects a touch on the displayed SCO and SIO, and provides the detecting result to the controller.

In accordance with a further aspect of the present invention, a method for receiving a message in a mobile communication terminal with a touch screen is provided. The method includes generating an SCO mapped to at least one phone number, displaying the generated SCO on an idle screen in a widget format, and, when a message is received, extracting sender information from a header of the received message, searching an SCO mapped to the same phone number as the extracted sender information, and informing the message reception through the searched SCO.

In accordance with yet another aspect of the present invention, an apparatus for receiving a message in a mobile communication terminal with a touch screen is provided. The apparatus includes a controller and the touch screen. The controller generates an SCO mapped to at least one phone number, displays the generated SCO on an idle screen in a widget format through the touch screen, and, when a message is received, extracts sender information from a header of the received message, searches an SCO mapped to the same phone number as the extracted sender information, and informs the message reception through the searched SCO. The touch screen displays the generated SCO on the idle screen in the widget format.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiment of the present invention will be more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein may be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

The following description is made for a way for transmitting/receiving a message in a mobile communication terminal with a touch screen according to the present invention.

Figure 1:
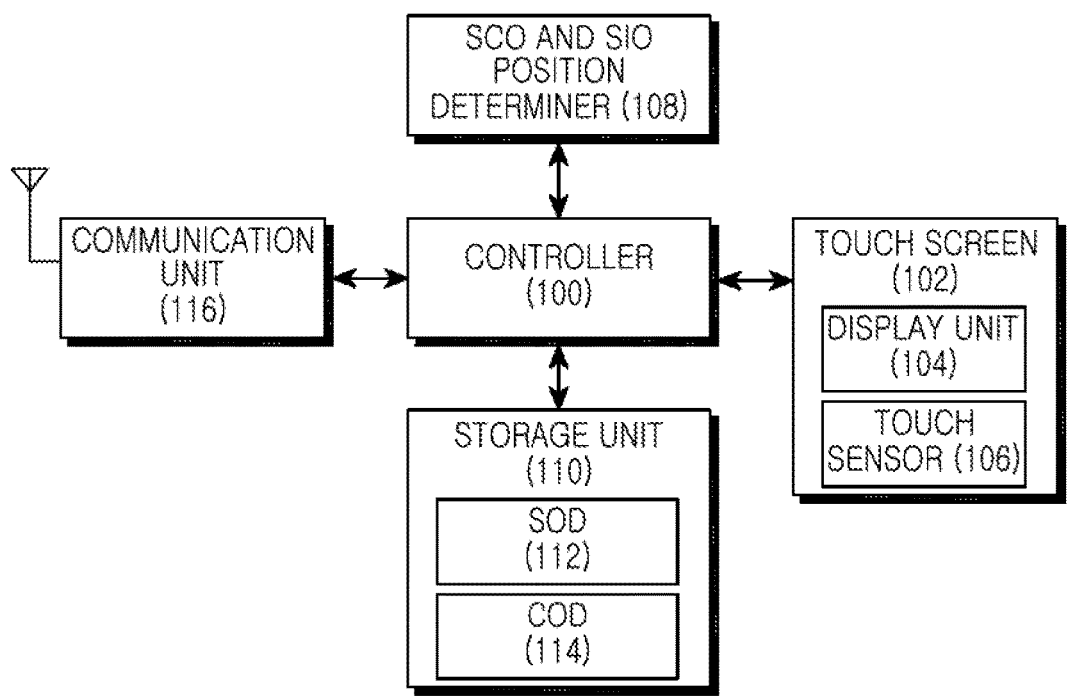
FIG. 1 is a block diagram illustrating a construction of a mobile communication terminal with a touch screen according to an exemplary embodiment of the present invention.

FIG. 1 is a block diagram illustrating a construction of a mobile communication terminal with a touch screen according to an exemplary embodiment of the present invention.

Referring to FIG. 1, the terminal (i.e., Mobile Station (MS)) includes a controller 100, a touch screen 102, a Simple Contact Object (SCO) and Simple Inputbox Object (SIO) position determiner 108, a storage unit 110, and a communication unit 116.

Figure 2:
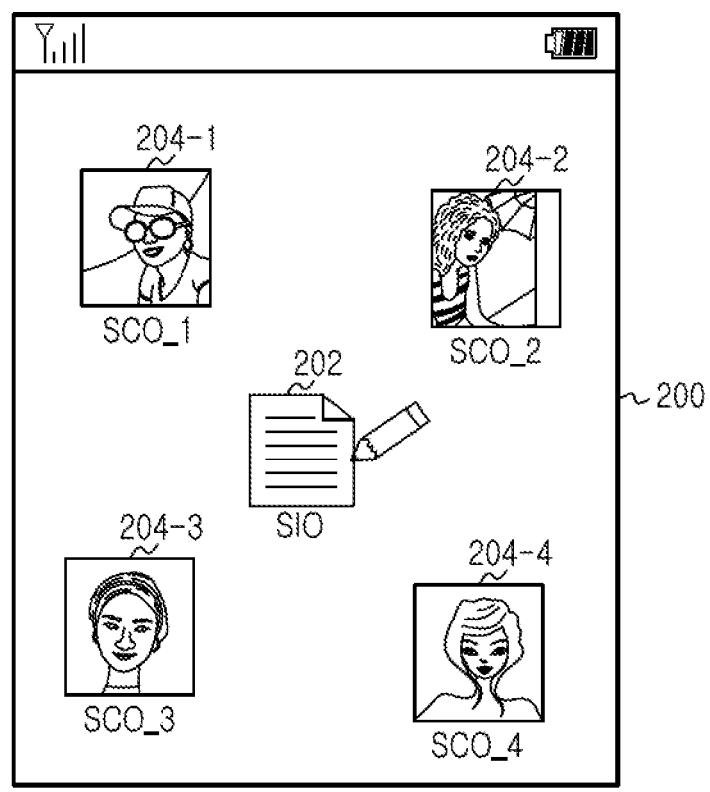
FIG. 2 is a diagram illustrating a Simple Contact Object (SCO) and a Simple Inputbox Object (SIO) displayed on an idle screen in a mobile communication terminal with a touch screen according to an exemplary embodiment of the present invention.

Referring again to FIG. 1, the controller 100 controls a general operation of the mobile communication terminal. For example, the controller 100 performs a process and control for voice communication and data communication. In addition to a general function, according to the present invention, the controller 100 processes a function for transmitting/receiving a message by combining the convenience of a touch screen with a message transmission/reception function. That is, the controller 100 processes a function for generating both an SCO mapped to a name and a phone number and an SIO for message composition, and displaying the generated SCO and SIO on an idle screen in a widget format. As illustrated in FIG. 2, four SCOs 204-1 to 204-4 and one SIO 202 are displayed on an idle screen 200 in a widget format. Here, the SCO is an object having information on a contact (e.g., a phone number, a name, etc.), and the SIO is an object generating and storing a message according to the user's key manipulation. Referring again to FIG. 1, the controller 100 stores setting information on the SCO and SIO in a Simple Object Database (SOD) 112 and a Contact Object DB (COD) 114 of the storage unit 110. Also, the controller 100 processes a function for detecting a user's touch on the SIO displayed on the idle screen, receiving a message from a user, storing the message in the SIO, detecting a drag and drop of the SIO storing the message therein, searching the SOD 112 for an SCO overlapped in its display position with the SIO, and then transmitting the message to a phone number mapped to the searched SCO. Also, the controller 100 processes a function for, when a message is received, extracting sender information from a header of the received message, searching the COD 114 for an SCO mapped to the same information (e.g., a name and a phone number) as the extracted sender information, and then informing the message reception through the searched SCO.

The touch screen 102 includes a display unit 104 and a touch sensor 106. The display unit 104 displays a variety of kinds of information related to a state and operation of the terminal. Particularly, in a character input mode, under control of the controller 100, the display unit 104 of the touch screen 102 displays key regions having an array of characters and numerals, and a character display region for displaying a character and numeral corresponding to a key region on which a touch is detected. Also, at least one character is arrayed in each key region displayed on the display unit 104 of the touch screen 102. The touch sensor 106 is mounted in the display unit 104. The touch sensor 106 detects a touch generated on the display unit 104, detects a coordinate of a region corresponding to the detected touch, and provides the detected coordinate to the controller 100.

The SCO and SIO position determiner 108 determines changed display positions of an SCO and an SIO using a coordinate of a touched region detected by the touch sensor 106, and provides display position information based on the determination to the controller 100. Here, the controller 100 updates display position information on the SCO and SIO stored in the SOD 112, using the display position information on the SCO and SIO provided from the SCO and SIO position determiner 108.

The storage unit 110 stores programs for processing and controlling operations of the mobile communication terminal, and a variety of data generated during execution of each program. In addition to a general function, according to the present invention, the storage unit 110 stores a program for transmitting/receiving a message by combining the convenience of a touch screen with a message transmission/reception function. Also, the storage unit 110 includes the SOD 112 and the COD 114. The SOD 112 and the COD 114 store setting information on an SCO and an SIO displayed in a widget format. In detail, the SOD 112 maps and stores IDentifier (ID), animation, icon, and display position information set to an SCO generated by a user, and maps and stores ID and display position information set to an SIO generated by the user. The COD 114 maps and stores ID, name, and phone number information set to the SCO generated by the user. Also, the storage unit 110 stores a phone book. Here, in the case that the phone book is edited, the controller 100 updates the name and phone number information on the SCO stored in the COD 114, according to the edited phone book.

The communication unit 116 transmits/receives a wireless signal through an antenna. For instance, the communication unit 116 modulates and up-converts a frequency of a signal from the controller 100, and transmits the signal through the antenna. Or, the communication unit 116 down-converts a frequency of, and demodulates, a wireless signal received through the antenna, and provides the signal to the controller 100.

Figure 3:
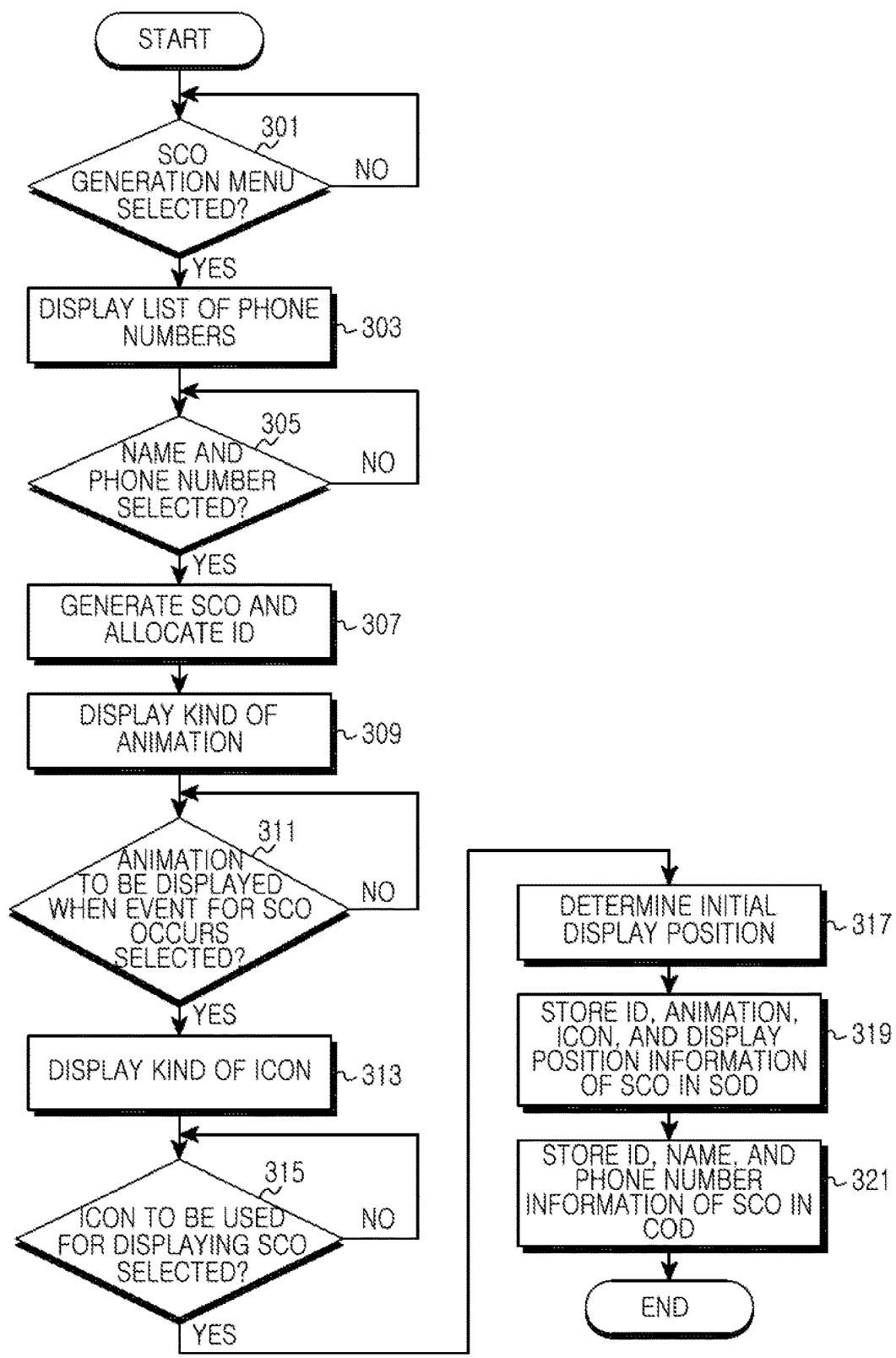
FIG. 3 is a flow diagram illustrating a method for generating an SCO in a mobile communication terminal with a touch screen according to an exemplary embodiment of the present invention.

FIG. 3 is a flow diagram illustrating a method for generating an SCO in a mobile communication terminal with a touch screen according to an exemplary embodiment of the present invention.

Referring to FIG. 3, in step 301, the terminal (i.e., MS) determines if an SCO generation menu is selected according to user's key manipulation.

If it is determined that the SCO generation menu is selected in step 301, the terminal displays a list of phone numbers on a display unit in step 303, and then, in step 305, the terminal determines if one phone number to be mapped to an SCO intended for generation and a name corresponding to the phone number are selected. Here, the phone number and name to be mapped to the SCO intended for generation may be selected in plural. In another exemplary embodiment, as the selection of the SCO generation menu is detected, the terminal may display an input window, and receive a phone number and name to be mapped to an SCO intended for generation, directly from a user.

If it is determined in step 305 that the name and phone number are selected, the terminal proceeds to step 307 and generates an SCO mapped to the selected name and phone number. At this time, for the sake of management of the generated SCO, the terminal may allocate an ID. A user may select a name and phone number frequently used for message transmission/reception and generate an SCO for the selected name and phone number.

After that, in step 309, the terminal displays a type of animation on the display unit. Then, in step 311, the terminal determines if an animation to be displayed on the display unit when an event for the generated SCO occurs is selected. For example, the terminal determines if an incoming animation to be displayed on the display unit in the case that a message is received from the external, an outgoing animation to be displayed on the display unit in the case that a message is transmitted to the external, or the like, is selected.

If it is determined in step 311 that the animation is selected, the terminal displays a type of icon on the display unit in step 313. Then, the terminal proceeds to step 315 and determines if an icon to be used for displaying the generated SCO is selected.

If it is determined in step 315 that the icon is selected, the terminal determines an initial display position of the generated SCO in step 317. Here, the initial display position may be determined by a default position. In a different way, the terminal may display an idle screen and enable a user to directly select the initial display position.

After that, in step 319, the terminal maps the ID allocated for the generated SCO, the animation and icon selected for the generated SCO, and the display position information determined for the generated SCO, and stores the mapping result in an SOD. In step 321, the terminal maps the ID allocated for the generated SCO and the name and phone number information mapped to the generated SCO, and stores the mapping result in a COD.

After that, the terminal terminates the method according to this exemplary embodiment of the present invention.

Figure 4:
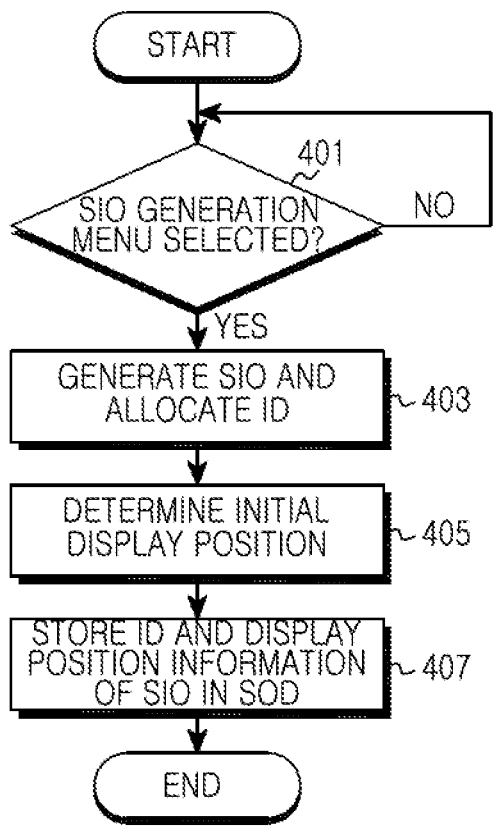
FIG. 4 is a flow diagram illustrating a method for generating an SIO in a mobile communication terminal with a touch screen according to an exemplary embodiment of the present invention.

FIG. 4 is a flow diagram illustrating a method for generating an SIO in a mobile communication terminal with a touch screen according to an exemplary embodiment of the present invention.

Referring to FIG. 4, in step 401, the terminal determines if an SIO generation menu is selected according to user's key manipulation. If it is determined in step 401 that the SIO generation menu is selected, the terminal proceeds to step 403 and generates an SIO. At this time, for the sake of management of the generated SIO, the terminal may allocate an ID.

After that, in step 405, the terminal determines an initial display position of the generated SIO. Here, the initial display position may be determined by a default position. In a different way, the terminal may display an idle screen and enable a user to directly select the initial display position.

Then, in step 407, the terminal maps the ID allocated for the generated SIO and the display position information determined for the generated SIO, and stores the mapping result in an SOD.

Further, the terminal displays the type of animation on a display unit and enables the user to select an animation to be displayed on the display unit when an event for the generated SIO occurs. Also, the terminal displays the type of icon on the display unit and enables the user to select an icon to be used for displaying the generated SIO.

After that, the terminal terminates the method according to this exemplary embodiment of the present invention.

Figure 5:
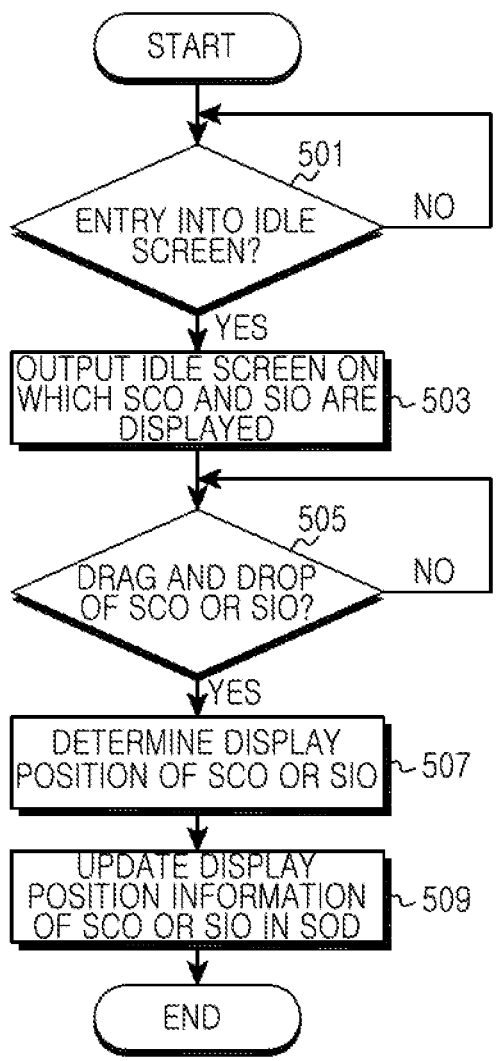
FIG. 5 is a flow diagram illustrating a method for changing display positions of an SCO and SIO in a mobile communication terminal with a touch screen according to an exemplary embodiment of the present invention.

FIG. 5 is a flow diagram illustrating a method for changing display positions of an SCO and an SIO in a mobile communication terminal with a touch screen according to an exemplary embodiment of the present invention.

Referring to FIG. 5, in step 501, the terminal determines if an entry into an idle screen mode is detected.

If it is determined in step 501 that the entry into the idle screen mode is detected, the terminal outputs an idle screen on which previously generated SCO and SIO are displayed, on a display unit, in step 503.

After that, in step 505, the terminal determines if a drag and drop of the SCO or SIO displayed on the idle screen is detected. That is, the terminal determines if a user drags and drops the SCO or SIO displayed on the idle screen.

When the drag and drop of the SCO or SIO displayed on the idle screen is detected in step 505, the terminal determines a display position of the SCO or SIO changed according to the drag and drop in step 507.

Then, in step 509, the terminal updates display position information of the SCO or SIO in an SOD according to the determined display position.

After that, the terminal terminates the method according to this exemplary embodiment of the present invention.

Figure 6:
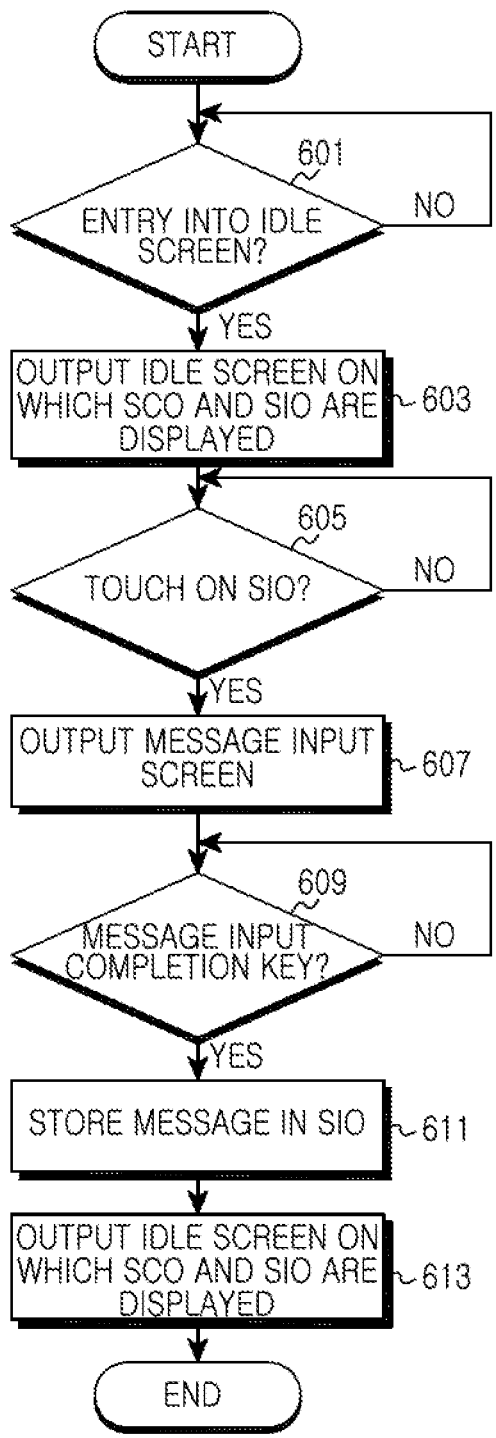
FIG. 6 is a flow diagram illustrating a method for generating and storing a message using an SIO in a mobile communication terminal with a touch screen according to an exemplary embodiment of the present invention.

FIG. 6 is a flow diagram illustrating a method for generating and storing a message using an SIO in a mobile communication terminal with a touch screen according to an exemplary embodiment of the present invention.

Referring to FIG. 6, in step 601, the terminal determines if an entry into an idle screen mode is detected.

If it is determined in step 601 that the entry into the idle screen mode is detected, the terminal outputs an idle screen on which previously generated SCO and SIO are displayed, on a display unit, in step 603.

After that, in step 605, the terminal determines if a touch on the SIO displayed on the idle screen is detected.

If it is determined in step 605 that the touch on the SIO displayed on the idle screen is detected, the terminal outputs a message input screen on the display unit in step 607. Accordingly, a user may then input a message through the message input screen.

Then, in step 609, the terminal determines if a message input completion key is input according to the user's key manipulation.

If it is determined in step 609 that the message input completion key is input, the terminal stores a message inputted by a user, in the SIO, in step 611. Then, in step 613, the terminal outputs an idle screen on which previously generated SCO and SIO are displayed, on the display unit. The message stored as above may be transmitted, by means of one SCO, to a phone number mapped to the SCO. According to another exemplary embodiment, the message may be shared for the sake of transmission using a plurality of SCOs.

Then, the terminal terminates the method according to this exemplary embodiment of the present invention.

Figure 7:
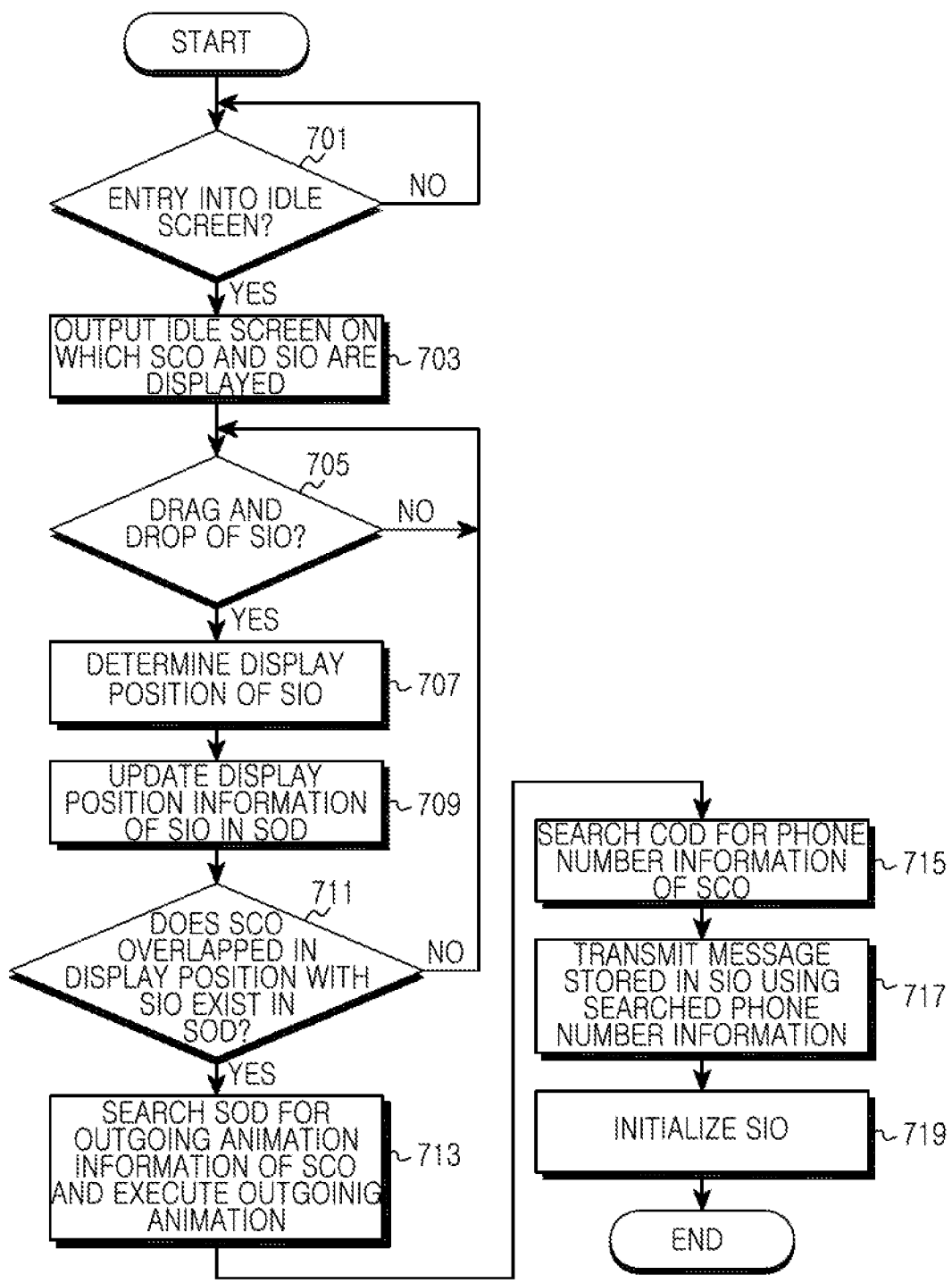
FIG. 7 is a flow diagram illustrating a method for transmitting a message stored in an SIO, using an SCO in a mobile communication terminal with a touch screen according to an exemplary embodiment of the present invention.

FIG. 7 is a flow diagram illustrating a method for transmitting a message stored in an SIO, using an SCO in a mobile communication terminal with a touch screen according to an exemplary embodiment of the present invention.

Referring to FIG. 7, in step 701, the terminal determines if an entry into an idle screen mode is detected.

If it is determined in step 701 that the entry into the idle screen mode is detected, the terminal outputs an idle screen on which previously generated SCO and SIO are displayed, on a display unit, in step 703.

After that, in step 705, the terminal determines if a drag and drop of the SIO displayed on the idle screen is detected. That is, the terminal determines if a user drags and drops the SIO displayed on the idle screen.

If it is determined in step 705 that the drag and drop of the SIO displayed on the idle screen is detected, the terminal determines a display position of the SIO changed according to the drag and drop in step 707.

Then, in step 709, the terminal updates display position information of the SIO in an SOD according to the determined display position.

After that, in step 711, the terminal determines if an SCO overlapped in its display position with the SIO exists in the SOD.

If it is determined in step 711 that the SCO overlapped in its display position with the SIO does not exist in the SOD, the terminal returns to step 705 and repeatedly performs the subsequent steps.

In contrast, if it is determined in step 711 that the SCO overlapped in its display position with the SIO exists in the SOD, the terminal searches the SOD for outgoing animation information set to the SCO and executes the searched outgoing animation in step 713.

After that, the terminal proceeds to step 715 and searches the COD for phone number information mapped to the SCO. Then, in step 717, the terminal transmits a message stored in the SIO using the searched phone number information.

Next, in step 719, the terminal initializes the SIO. For example, the terminal deletes the message stored in the SIO and initializes the display position of the SIO to an initial display position. According to another exemplary embodiment, when initializing the SIO, the terminal may display a message inquiring as to the deletion or non-deletion of the message stored in the SIO on a display unit and, according to the user's selection, the terminal may delete the message stored in the SIO. According to a further exemplary embodiment, when initializing the SIO, the terminal may delete the message stored in the SIO, with reference to setting information on the deletion or non-deletion of the message stored in the SIO.

After that, the terminal terminates the method according to this exemplary embodiment of the present invention.

Figure 8:
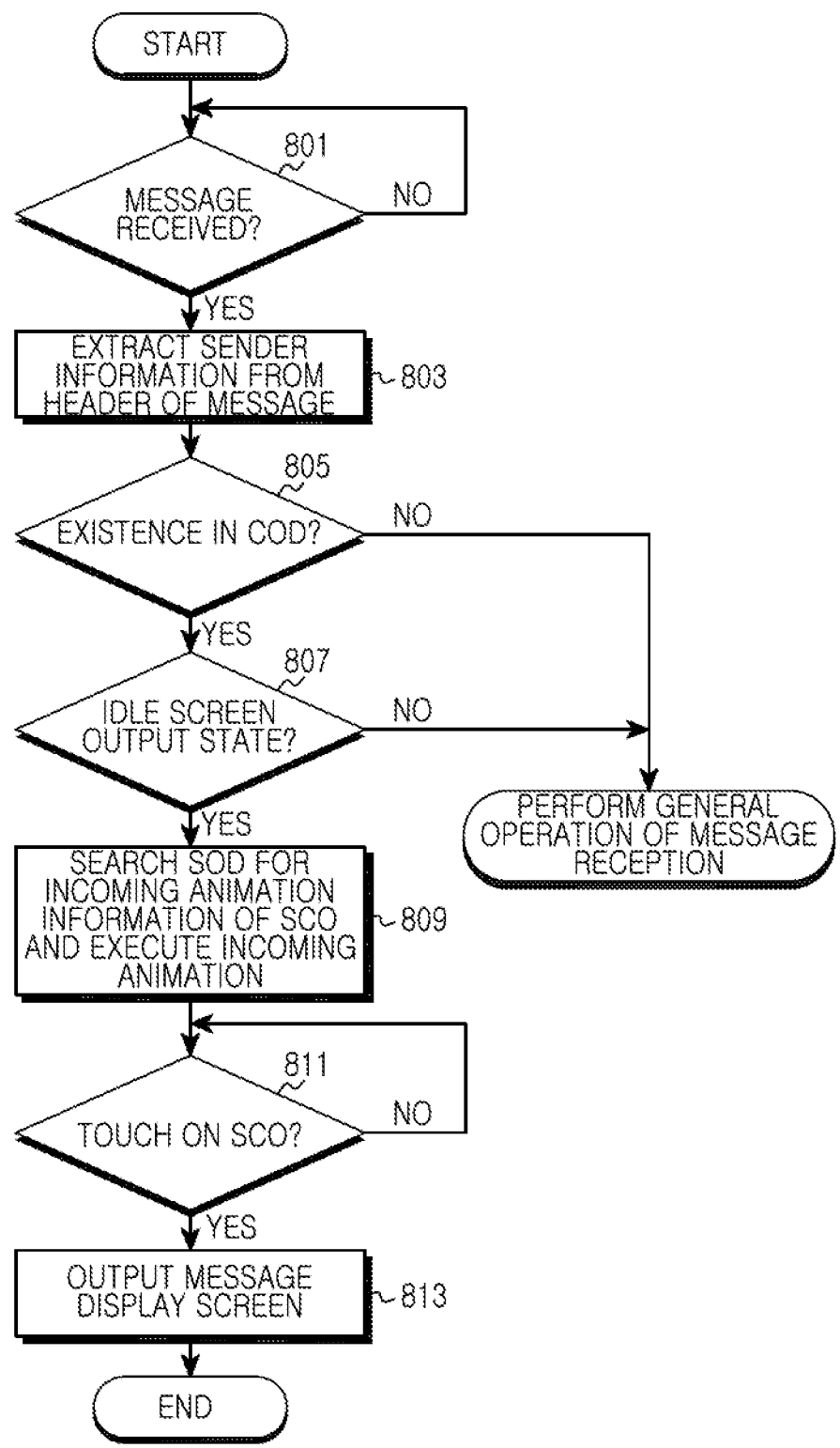
FIG. 8 is a flow diagram illustrating a method for receiving a message using an SCO in a mobile communication terminal with a touch screen according to an exemplary embodiment of the present invention.

FIG. 8 is a flow diagram illustrating a method for receiving a message using an SCO in a mobile communication terminal with a touch screen according to an exemplary embodiment of the present invention.

Referring to FIG. 8, in step 801, the terminal determines if a message is received.

If it is determined in step 801 that the message is received, the terminal extracts sender information from a header of the received message in step 803. Then, in step 805, the terminal determines if the same information (e.g., a name and a phone number) as the extracted sender information exists in a COD. That is, the terminal determines if an SCO mapped to the same information as the extracted sender information exists.

If it is determined in step 805 that the same information as the extracted sender information does not exist in the COD, the terminal performs a general operation of message reception.

In contrast, if it is determined in step 805 that the same information as the extracted sender information exists in the COD, the terminal determines if it is a state in which an idle screen is currently in output in step 807.

When it is not the state in which the idle screen is currently in output in step 807, the terminal performs a general operation of message reception.

In contrast, if it is determined in step 807 that it is the state in which the idle screen is currently in output, the terminal searches an SOD for incoming animation information set to the SCO and executes the searched incoming animation in step 809.

After that, in step 811, the terminal determines if a touch on the SCO is detected.

If it is determined in step 811 that the touch on the SCO is detected, the terminal outputs a message display screen on a display unit, and enables a user to identify the received message, in step 813. According to another exemplary embodiment, the terminal outputs a message display screen on the display unit just after executing an incoming animation, and enables a user to identify the received message. According to a further exemplary embodiment, in the case that two or more non-reception messages exist, the terminal outputs the existence of the non-reception messages on a display unit and then, in the case that there is a request for identification of the non-reception message, the terminal outputs a message display screen on the display unit and enables a user to identify the received message.

After that, the terminal terminates the method according to this exemplary embodiment of the present invention.

Figure 9:
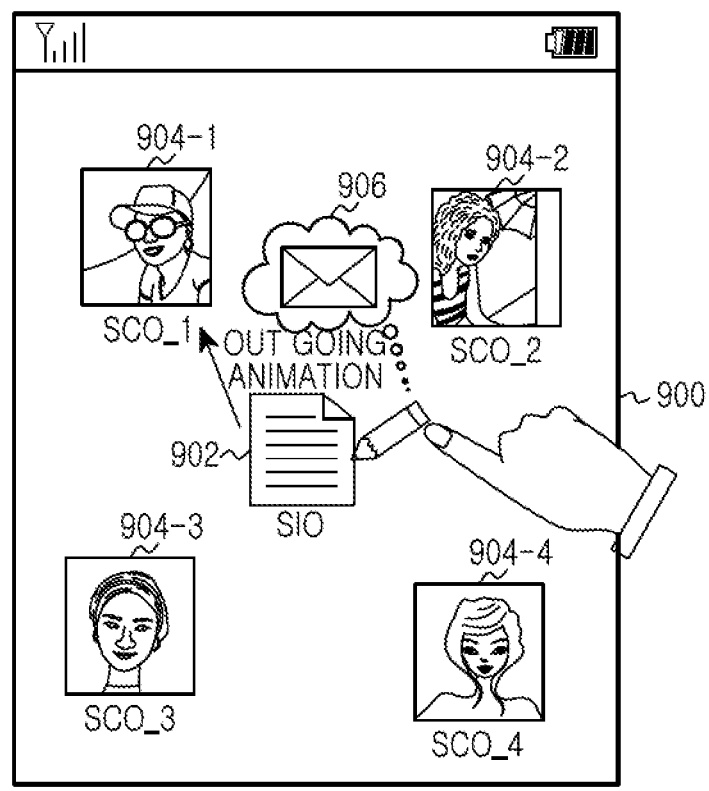
FIG. 9 is a diagram illustrating a method for transmitting a message stored in an SIO, using an SCO in a mobile communication terminal with a touch screen according to an exemplary embodiment of the present invention.

FIG. 9 is a diagram illustrating a method for transmitting a message stored in an SIO, using an SCO in a mobile communication terminal with a touch screen according to an exemplary embodiment of the present invention.

Referring to FIG. 9, the terminal generates four SCOs 904-1 to 904-4 mapped to names and phone numbers and one SIO 902 for message composition, and displays the generated SCOs 904-1 to 904-4 and SIO 902 on an idle screen 900 in a widget format. After that, the terminal detects a user's touch on the SIO 902 displayed on the idle screen 900, receives and stores a message from a user, detects a drag and drop of the SIO 902 to, for example, SCO_1 904-1, storing the message therein, searches an SOD for the SCO_1 904-1 overlapped in its display position with the SIO 902, and then transmits the message to the phone number mapped to the searched SCO_1 904-1. At this time, the terminal may search the SOD for outgoing animation information set to the SCO 904-1 and execute the searched outgoing animation 906.

Figure 10:
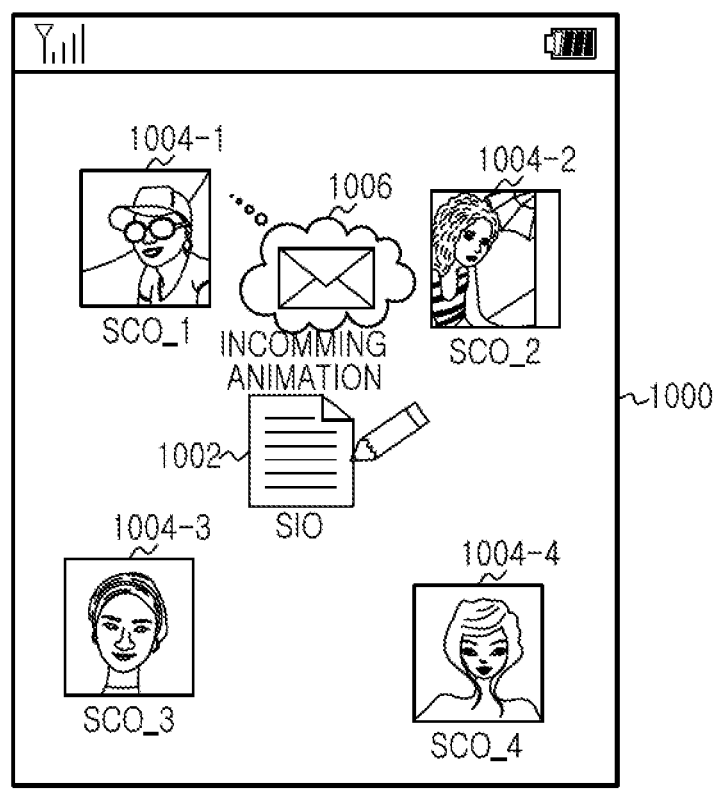
FIG. 10 is a diagram illustrating a method for receiving a message using an SCO in a mobile communication terminal with a touch screen according to an exemplary embodiment of the present invention.

FIG. 10 is a diagram illustrating a method for receiving a message using an SCO in a mobile communication terminal with a touch screen according to an exemplary embodiment of the present invention.

Referring to FIG. 10, the terminal generates four SCOs 1004-1 to 1004-4 mapped to names and phone numbers and one SIO 1002 for message composition, and displays the generated SCOs 1004-1 to 1004-4 and SIO 1002 on an idle screen 1000 in a widget format. After that, when a message is received, the terminal extracts sender information from a header of the received message, searches a COD for, for example, the SCO_1 1004-1 mapped to the same information (e.g., a name and phone number) as the extracted sender information, and then processes a function for informing the message reception through the searched SCO_1 1004-1. For example, the terminal may search an SOD for incoming animation information set to the SCO_1 1004-1, and execute the searched incoming animation 1006.

On the other hand, in an exemplary embodiment of the present invention, message transmission/reception using a phone number is described, for example. However, in another exemplary embodiment, the present invention is undoubtedly applicable even to e-mail transmission/reception using an e-mail address.

Also, in an exemplary embodiment of the present invention, a description is, for example, made for detecting a drag and drop of an SIO, searching an SCO overlapped in its display position with the SIO, and transmitting a message to a phone number mapped to the searched SCO. However, in another exemplary embodiment, the present invention may detect if a user pushes and throws an SIO with touching the SIO, search an SCO colliding with the SIO, and transmit a message to a phone number mapped to the searched SCO.

As described above, the present invention is to provide an apparatus and method for combining the convenience of a touch screen with a message transmission/reception function and enabling a user to conveniently and interestingly transmit/receive a message in an idle screen in a mobile communication terminal with a touch screen. Accordingly, the present invention has an advantage of, in case that intending to forward a message to a called party, being capable of composing a message at one touch and transmitting the composed message by one drag and drop, with no trouble of having to performing a message transmission process through a menu of several steps. Accordingly, a user may simply, conveniently, and rapidly transmit a message. Also, the present invention has an advantage of being capable of simply, conveniently, and rapidly forwarding a previously composed message to a plurality of called parties through a drag and drop. Also, because a user may conveniently and interestingly transmit/receive a message in an idle screen, the present invention has an advantage of being capable of increasing the frequency of message use of the user.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An apparatus comprising:
   a display;
   a memory; and
   at least one processor operatively coupled with the display and the memory, the at least one processor configured to:

store, via the memory, a plurality of contacts,
select a contact among the plurality of contacts,
in response to selection of the contact, present, within a first screen via the display, a widget corresponding to the selected contact,
while the widget is presented in the first screen, receive a message corresponding to the selected contact,
in response to receiving the message, present, via the widget, a representation indicative of receipt of the message,
detect a user input on the representation being presented, and
present, via the display, information corresponding to the message in response to the user input.

2. The apparatus of claim 1, wherein the user input is received via at least one portion of the widget.

3. The apparatus of claim 1,
wherein the widget comprises a first rectangular widget and a second rectangular widget,
wherein the contact comprises a first contact and a second contact, and
wherein the first rectangular widget corresponds to the first contact and the second rectangular widget corresponds to the second contact.

4. The apparatus of claim 1, wherein at least one portion of the widget is to be automatically changed.

5. The apparatus of claim 4, wherein the at least one portion is to present at least one of a name, a phone number, or an image.

6. The apparatus of claim 5,
wherein the at least one portion comprises a first portion and a second portion, and
wherein the name is to be presented via the first portion and the image is to be presented via the second portion.

7. The apparatus of claim 1, wherein the at least one processor is further configured to:
present the message using an application related to the message.

8. The apparatus of claim 1, wherein the selected contact is selected based at least in part on another user input received prior to the presenting of the widget.

9. The apparatus of claim 1, wherein the information corresponding to the message is presented within the second screen that is switched from the first screen.

10. The apparatus of claim 1, wherein the at least one processor is configured to execute a plurality of applications, a first application used for presenting the information corresponding to the message is distinct from a second application used for presenting the representation.

11. The mobile apparatus of claim 1,
wherein the at least one processor is configured to:
display a plurality of widgets being mapped to a respective plurality of contacts,
receive a message while the plurality of widgets are displayed, and
if the received message is from a contact mapped to one of the plurality of widgets displayed on an idle screen, display a representation associated with a corresponding one of the widgets informing of reception of the received message, and
wherein the representation is displayed before displaying content of the received message.

12. A method comprising:
displaying, at a first device, a widget corresponding to a selected contact among one or more contacts stored in the first device, via a display operatively coupled with the first device, prior to receiving a message corresponding to the selected contact;
associating a user account with the selected contact, the user account selected by a user input;
receiving a message corresponding to the user account;
displaying, via the widget, a representation indicative of the message received from a second device;
detecting a user input on the representation being displayed; and
displaying, via the display, information corresponding to the message in response to the detection.

13. The method of claim 12, wherein the displaying of the representation comprises:
displaying, via the widget, an animation as at least part of the representation.

14. The method of claim 12, wherein the displaying of the widget comprises:
changing at least one of a size, a shape, or content of the widget based on another user input.

15. The method of claim 12, wherein the displaying of the widget comprises:
changing at least one of a size, a shape, or content of the widget automatically.

16. The method of claim 15, wherein the displaying of the message comprises:
displaying, via the widget, at least one of a name, a phone number, or an image associated with the contact.

17. An apparatus comprising:
a display; and
at least one processor operatively coupled with the display, the at least one processor configured to:
store, via a memory, a plurality of contact information,
select a contact among the plurality of contact information,
in response to selection of the contact information, present, via the display, a dynamic graphical user interface object corresponding to the selected contact information,
while the widget is presented in the display, receive a message corresponding to the selected contact from an electronic device external to the apparatus,
in response to the message, present, via the dynamic graphical user interface object, an indication of receipt of the message based at least in part on a determination that the message corresponds to at least one portion of the contact information,
detect a user input on the representation being presented, and
present, via the display, at least one portion of the message in response to the user input.

18. The apparatus of claim 17, wherein the electronic device corresponds to the contact information.

19. The apparatus of claim 17, wherein the dynamic graphical user interface object is a tile shape.

20. The apparatus of claim 17, wherein at least one portion of the dynamic graphical user interface object is to present information corresponding to the at least one contact, the at least one portion to be automatically changed.

21. The apparatus of claim 20, wherein the information comprises at least one of a name, a phone number, and an image.

22. The apparatus of claim 17, wherein the indication comprises a name corresponding to the contact information.

23. The apparatus of claim 17, wherein the at least one processor is further configured to:
- present, via the display, a menu including a phone number,
- wherein the dynamic graphical user interface object corresponding to the phone number is to be created based at least in part on an input associated with the menu.

24. A non-transitory machine-readable storage device storing instructions that, when executed by one or more processors, cause the one or more processors to perform operations comprising:
- storing, via a memory of a first device, a plurality of contacts,
- selecting a contact among the plurality of contacts;
- in response to selection of the contact, displaying, at the first device, a widget corresponding to a selected contact, via a display operatively coupled with the first device, prior to receiving a message corresponding to the selected contact;
- while the widget is presented in the display, receiving a message corresponding to the selected contact;
- in response to receiving the message, displaying, via the widget, a representation indicative of the message received from a second device;
- detecting a user input on the representation being displayed; and
- displaying, via the display, at least part of the message in response to the detection user input.

* * * * *